United States Patent
Ozawa et al.

(10) Patent No.: US 8,792,719 B2
(45) Date of Patent: Jul. 29, 2014

(54) IMAGE PROCESSING DEVICE DETERMINING ATTRIBUTES OF REGIONS

(75) Inventors: Ryohei Ozawa, Nagoya (JP); Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/562,227

(22) Filed: Jul. 30, 2012

(65) Prior Publication Data

US 2013/0028518 A1 Jan. 31, 2013

(30) Foreign Application Priority Data

Jul. 29, 2011 (JP) ................... 2011-167176

(51) Int. Cl.
*G06K 9/34* (2006.01)
*G06F 15/00* (2006.01)
*G06K 1/00* (2006.01)

(52) U.S. Cl.
USPC .......................................... 382/173; 358/1.9

(58) Field of Classification Search
USPC ......... 382/112, 175, 176, 177, 190, 195, 199; 358/1.9, 1.13, 3.06
See application file for complete search history.

(56) References Cited

U.S. PATENT DOCUMENTS

| | | | |
|---|---|---|---|
| 6,104,832 A | 8/2000 | Saito et al. | |
| 6,731,801 B2 | 5/2004 | Murakawa et al. | |
| 7,343,046 B2 | 3/2008 | Curry et al. | |
| 7,505,174 B2 | 3/2009 | Matsumoto et al. | |
| 7,508,998 B2 | 3/2009 | Shiiyama | |
| 7,606,419 B2 | 10/2009 | Koshi et al. | |
| 7,773,776 B2 * | 8/2010 | Adachi | ......................... 382/112 |
| 7,844,118 B1 | 11/2010 | Li et al. | |
| 8,194,941 B2 | 6/2012 | Hara | |
| 8,208,774 B2 | 6/2012 | Kudou et al. | |

(Continued)

FOREIGN PATENT DOCUMENTS

| | | |
|---|---|---|
| EP | 0516576 A2 | 12/1992 |
| EP | 1006717 A2 | 6/2000 |

(Continued)

OTHER PUBLICATIONS

Klink, Stefan et al., Rule-based Document Structure Understanding with a Fuzzy Combination of Layout and Textual Features, International Journal of Document Analysis and Recognition, Jan. 1, 2001, XP55015513, Retrieved from the Internet: URL:http://citeseerx.ist.psu.edu/viewdoc/download?doi=10.1.1.28..4808&rep=rep1&type=pdf [retrieved on Dec. 29, 2011].

(Continued)

*Primary Examiner* — Andrae S Allison
(74) *Attorney, Agent, or Firm* — Baker Botts L.L.P.

(57) ABSTRACT

An image processing device includes a processor; and a memory storing computer readable instructions therein. The computer-readable instructions, when executed by the processor, causes the image processing device to perform: preparing image data representing an image; identifying a first region in the image and a second region disposed inside of the first region; determining an attribute of the first region to be one of a plurality of attributes; and determining, when the attribute of the first region is determined to be the first type attribute, an attribute of the second region by using the attribute of the first region. The plurality of attributes includes a first type attribute indicating one of photo and drawing.

12 Claims, 11 Drawing Sheets

(56) References Cited

U.S. PATENT DOCUMENTS

| | | | |
|---|---|---|---|
| 8,320,674 | B2 | 11/2012 | Guillou et al. |
| 8,396,298 | B2 * | 3/2013 | Dai .............................. 382/199 |
| 8,520,093 | B2 | 8/2013 | Nanu et al. |
| 2004/0247204 | A1 | 12/2004 | Lim et al. |
| 2005/0180645 | A1 | 8/2005 | Hasegawa et al. |
| 2006/0039608 | A1 | 2/2006 | Nishida |
| 2006/0115169 | A1 | 6/2006 | Ohk |
| 2007/0236707 | A1 | 10/2007 | Shoda |
| 2007/0286478 | A1 | 12/2007 | Kishi |
| 2007/0286507 | A1 | 12/2007 | Mori |
| 2008/0101698 | A1 | 5/2008 | Yago |
| 2008/0122877 | A1 | 5/2008 | Aoyama |
| 2009/0148039 | A1 | 6/2009 | Chen et al. |
| 2009/0297024 | A1 * | 12/2009 | Dai .............................. 382/165 |
| 2010/0142806 | A1 | 6/2010 | Malik et al. |
| 2010/0142854 | A1 * | 6/2010 | Grunder ........................ 382/298 |
| 2010/0260417 | A1 * | 10/2010 | Dai .............................. 382/165 |
| 2010/0265549 | A1 * | 10/2010 | Kashibuchi et al. ......... 358/3.06 |
| 2010/0310170 | A1 | 12/2010 | Li et al. |
| 2011/0158529 | A1 | 6/2011 | Malik |
| 2011/0222762 | A1 * | 9/2011 | Matsuguma et al. ......... 382/164 |
| 2011/0252315 | A1 | 10/2011 | Misawa et al. |
| 2012/0057795 | A1 * | 3/2012 | Konishi ........................ 382/195 |
| 2013/0027732 | A1 | 1/2013 | Ozawa et al. |
| 2013/0028520 | A1 | 1/2013 | Kondo et al. |
| 2013/0028524 | A1 | 1/2013 | Kondo et al. |
| 2013/0259365 | A1 | 10/2013 | Suzuki et al. |

FOREIGN PATENT DOCUMENTS

| | | | |
|---|---|---|---|
| JP | H05-081474 | A | 4/1993 |
| JP | H05-166002 | A | 7/1993 |
| JP | H05-225378 | A | 9/1993 |
| JP | H06-056618 | B2 | 7/1994 |
| JP | H06-208625 | A | 7/1994 |
| JP | H09-114922 | A | 5/1997 |
| JP | 2001-127999 | A | 5/2001 |
| JP | 2002-176564 | A | 6/2002 |
| JP | 2004-362541 | A | 12/2004 |
| JP | 2006-085665 | A | 3/2006 |
| JP | 2007-310775 | A | 11/2007 |
| JP | 2007-336000 | A | 12/2007 |
| JP | 2008-282095 | A | 11/2008 |
| JP | 2009-123206 | A | 6/2009 |
| WO | 2008/039365 | A1 | 4/2008 |

OTHER PUBLICATIONS

European Patent Office, extended European Search Report for European Patent Application No. 12178341.9 (counterpart European patent application), dated Nov. 5, 2012.

Pietikainen, Matti et al., "Edge-Based Method for Text Detection from Complex Document Images", Document Analysis and Recognition, 2001, Proceedings, Sixth International Conference on Seattle, WA, USA, Sep. 10, 2001, pp. 286-291.

Zhong, Yu, et al., "Automatic Caption Localization in Compressed Video", IEEE Transactions on Pattern Analysis and Machine Intelligence, IEEE Service Center, Los Alamitos, CA, USA, vol. 22, No. 4, Apr. 1, 2000, pp. 385-392.

Cheng, Shyi-Chyi, et al., "Visual Object Retrieval Via Block-Based Visual-Pattern Matching", Pattern Recognition, Elsevier, GB, vol. 40, No. 6, Mar. 18, 2007, pp. 1695-1710.

Haneda, Eri, et al., "Text Segmentation for MRC Document Compression", IEEE Transactions on Image Processing, IEEE Service Center, Piscataway, NJ, USA, vol. 20, No. 6, Jun. 1, 2011, pp. 1611-1626.

European Patent Office, extended European Search Report for European Patent Application No. 12178346.8 (counterpart European Patent Application), mailed Nov. 12, 2012.

United States Patent and Trademark Office, Non Final Rejection for U.S. Appl. No. 13/562,121 (related to above-captioned patent application), mailed Feb. 13, 2014.

* cited by examiner

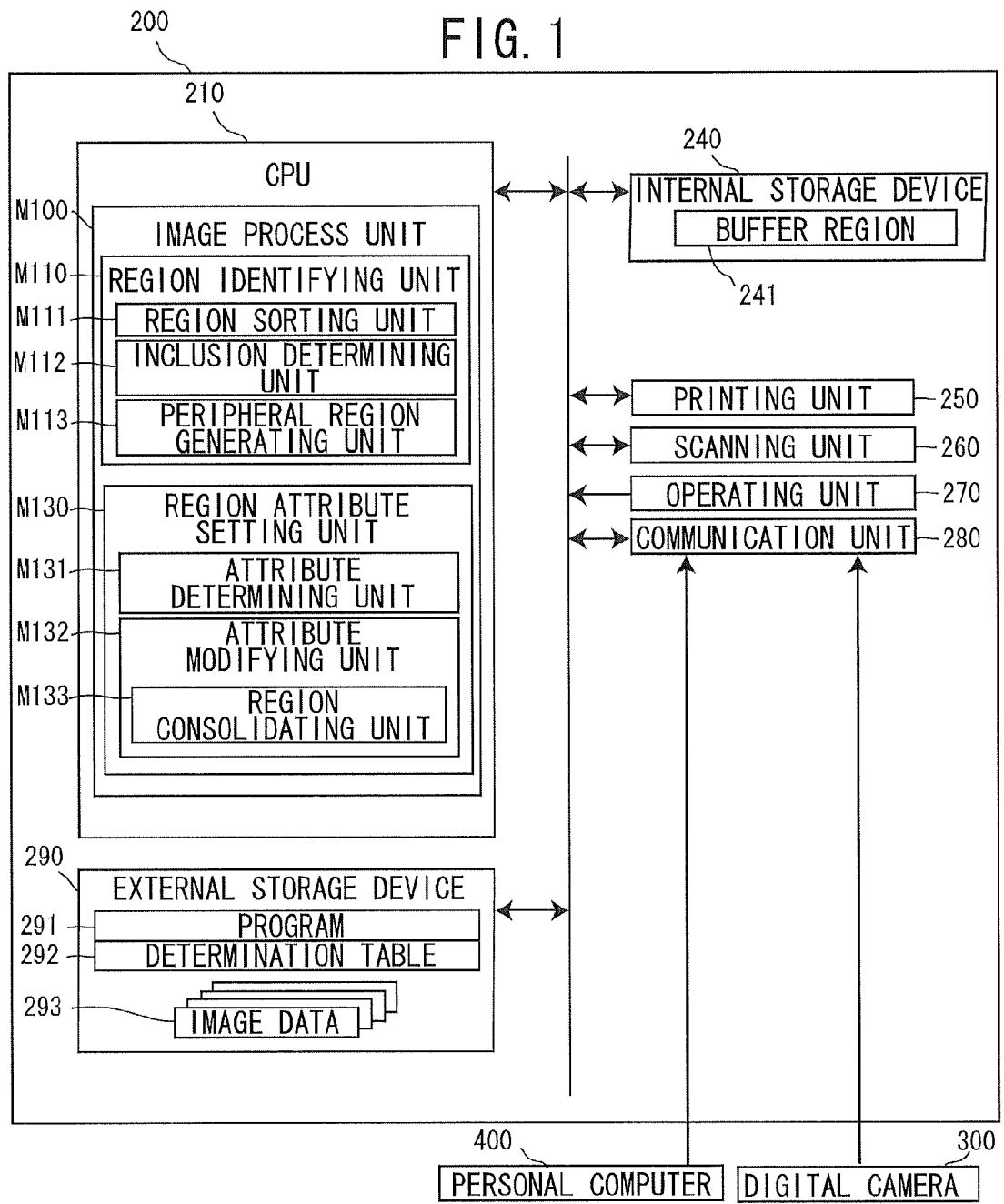

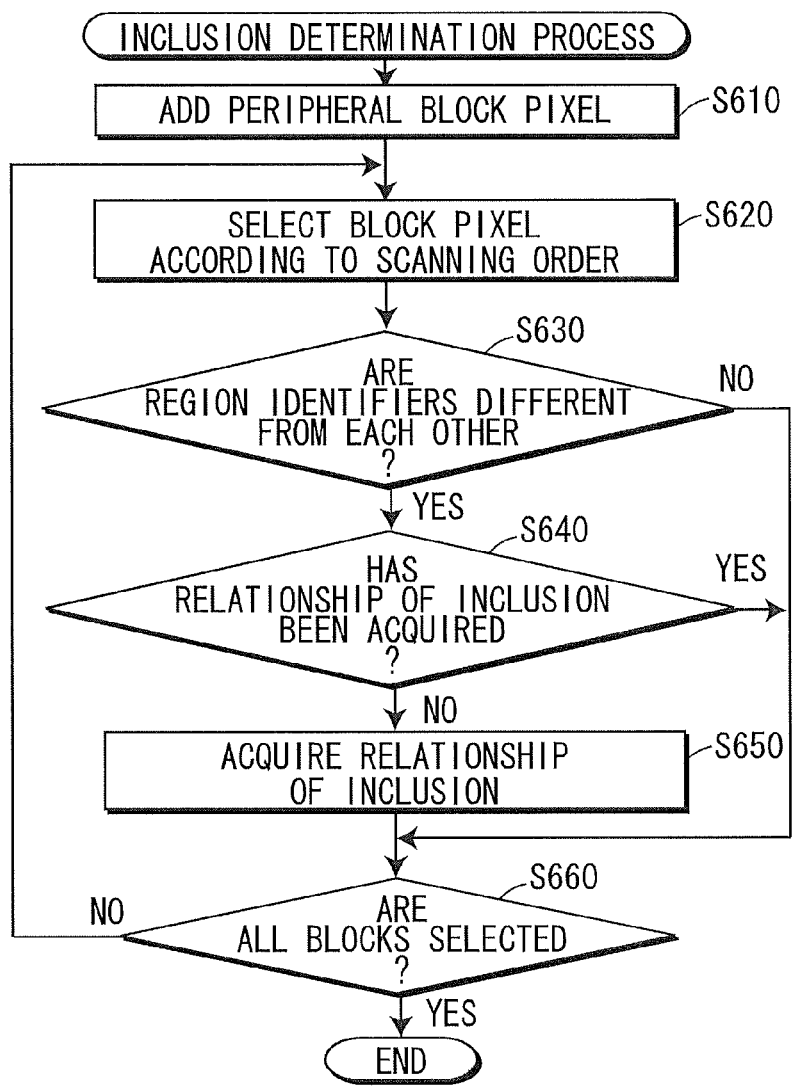

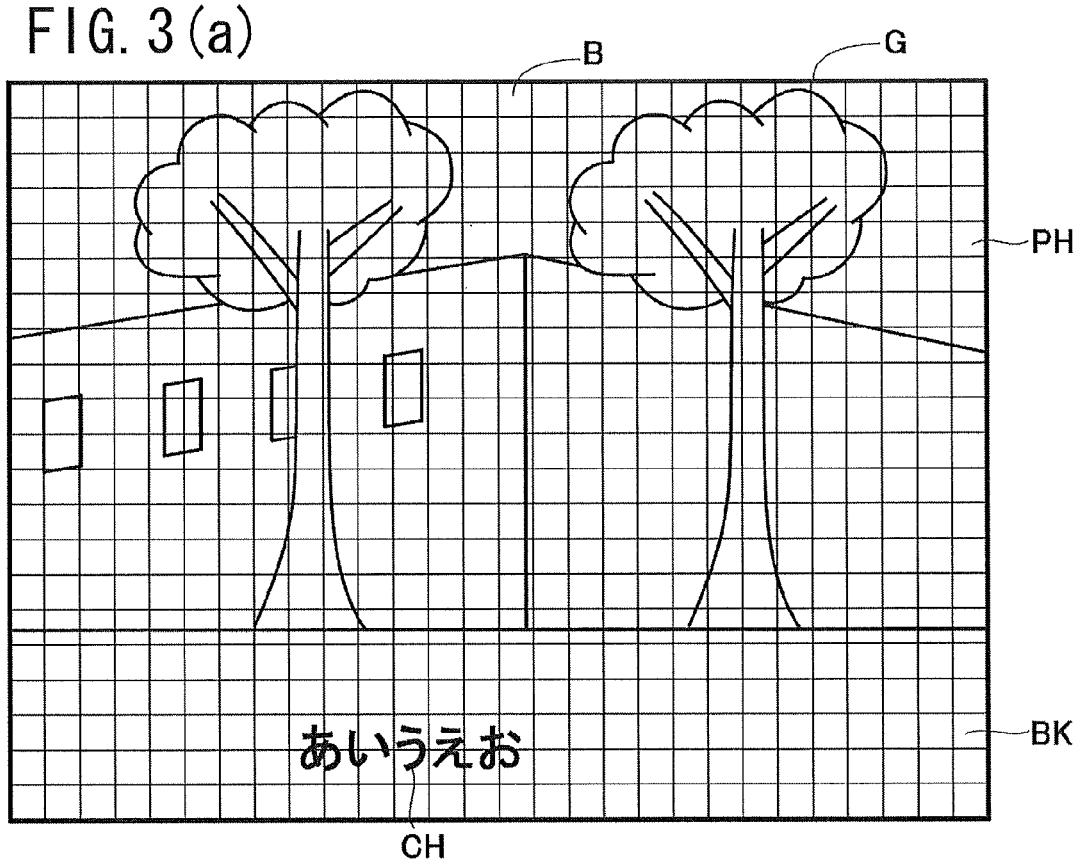

FIG. 8(a)

EMBODIMENT

|  |  | PARENT REGION |||| 
|---|---|---|---|---|---|
|  |  | TEXT | PHOTO | DRAWING | UNIFORM |
| CHILD REGION | TEXT |  | CONSOLIDATE |  |  |
|  | PHOTO |  | CONSOLIDATE |  |  |
|  | DRAWING |  | CONSOLIDATE | CONSOLIDATE |  |
|  | UNIFORM |  | CONSOLIDATE | CONSOLIDATE |  |

FIG. 8(b)

MODIFICATION

|  |  | PARENT REGION ||||
|---|---|---|---|---|---|
|  |  | TEXT | PHOTO | DRAWING | UNIFORM |
| CHILD REGION | TEXT |  | CONSOLIDATE |  |  |
|  | PHOTO |  | CONSOLIDATE | CHANGED TO PHOTO |  |
|  | DRAWING |  | CONSOLIDATE | CONSOLIDATE |  |
|  | UNIFORM |  | CONSOLIDATE | CONSOLIDATE |  |

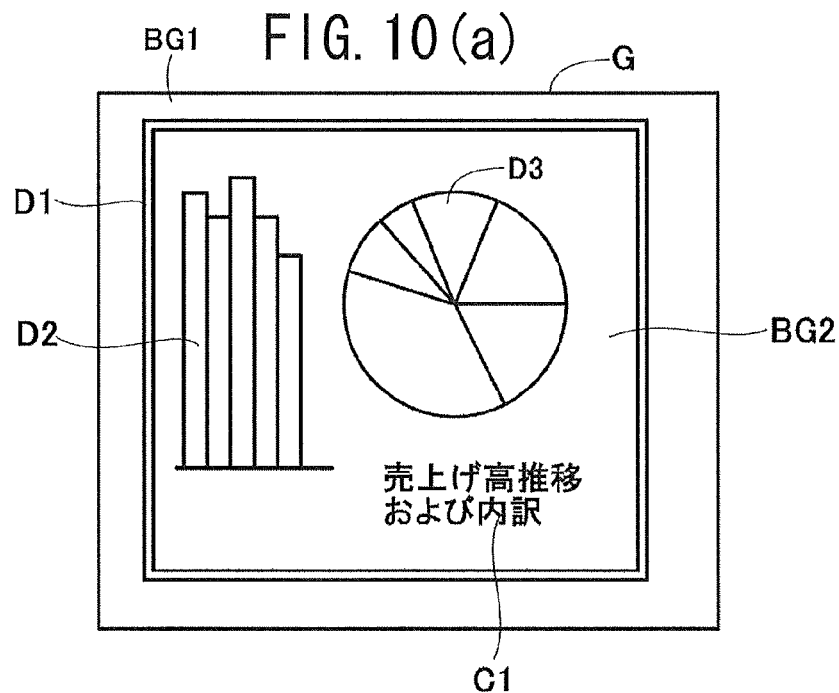
FIG. 10(a)
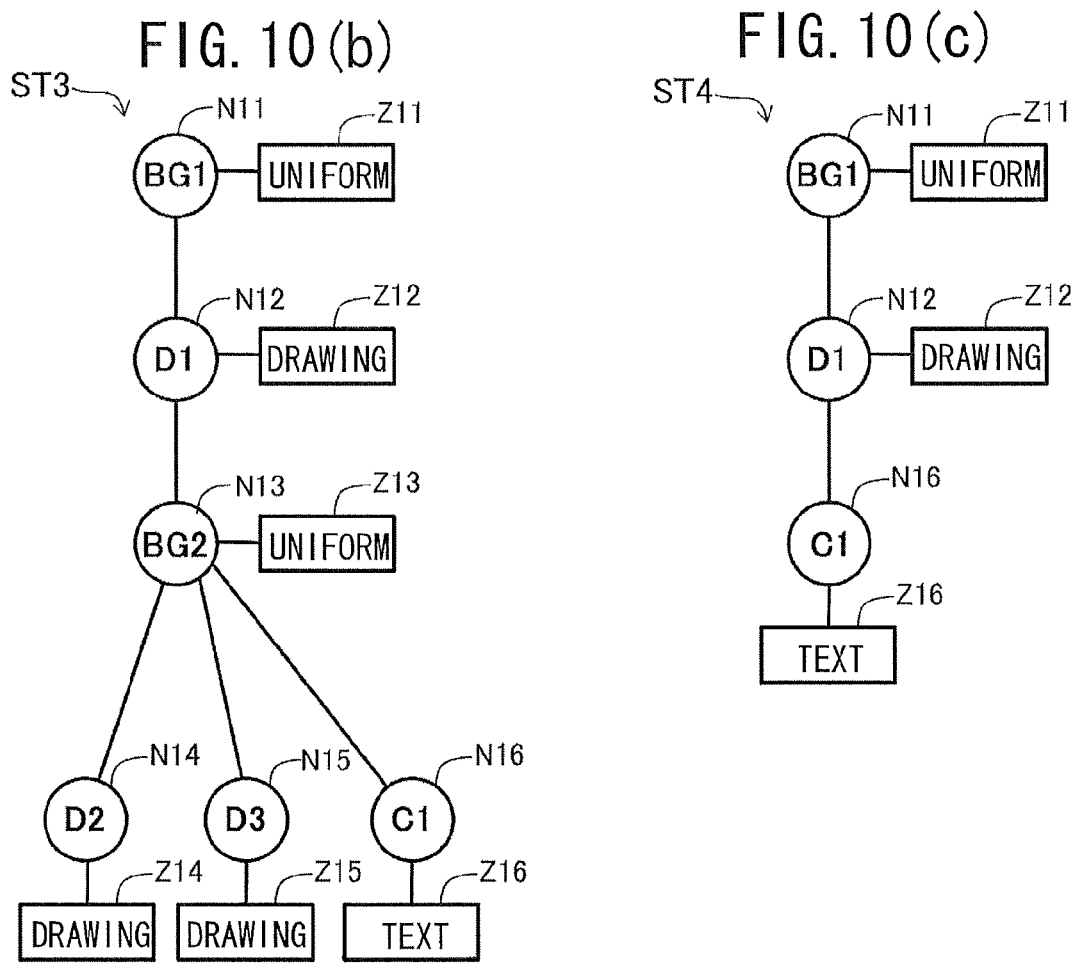
FIG. 10(b)
FIG. 10(c)

IMAGE PROCESSING DEVICE DETERMINING ATTRIBUTES OF REGIONS

CROSS REFERENCE TO RELATED APPLICATION

This application claims priority from Japanese Patent Application No. 2011-167176 filed Jul. 29, 2011. The entire content of the priority application is incorporated herein by reference.

TECHNICAL FIELD

The invention relates to a technology for determining the attribute of a target image.

BACKGROUND

There are known in the art techniques for determining the attribute of a target image based on image data representing the target image. By correctly determining the attributes of target images, an image processing device can perform image processing and the like suited to these attributes. According to one technology known in the art, an image processing device identifies parent regions of an image and subsequently identifies child regions obtained by dividing the parent regions. The image processing device then determines an attribute for each child region (photo, drawing, and the like) and sets attributes of the parent regions based on the attributes of the child regions.

SUMMARY

However, it is necessary to improve the accuracy of this technology in determining the attributes of target regions.

Therefore, it is an object of the invention to improve the accuracy in determining attributes of target regions.

In order to attain the above and other objects, the invention provides an image processing device. The image processing device includes a processor; and a memory storing computer readable instructions therein. The computer-readable instructions, when executed by the processor, causes the image processing device to perform: preparing image data representing an image; identifying a first region in the image and a second region disposed inside of the first region; determining an attribute of the first region to be one of a plurality of attributes, where the plurality of attributes includes a first type attribute indicating one of photo and drawing; and determining, when the attribute of the first region is determined to be the first type attribute, an attribute of the second region by using the attribute of the first region.

According to another aspect, the present invention provides a non-transitory computer-readable storage medium storing computer-readable instructions that, when executed by a processor cause an image processing device to perform: preparing image data representing an image; identifying a first region in the image and a second region disposed inside of the first region; determining an attribute of the first region to be one of a plurality of attributes, where the plurality of attributes including a first type attribute indicates one of photo and drawing; and determining, when the attribute of the first region is determined to be the first type attribute, an attribute of the second region by using the attribute of the first region.

According to another aspect, the present invention provides a method for controlling an image processing device. The method includes: preparing image data representing an image; identifying a first region in the image and a second region disposed inside of the first region; determining an attribute of the first region to be one of a plurality of attributes, the plurality of attributes including a first type attribute indicating one of photo and drawing; and determining, when the attribute of the first region is determined to be the first type attribute, an attribute of the second region by using the attribute of the first region.

BRIEF DESCRIPTION OF THE DRAWINGS

The particular features and advantages of the invention as well as other objects will become apparent from the following description taken in connection with the accompanying drawings, in which:

FIG. 1 is a block diagram showing a multifunction peripheral according to an embodiment of an invention;

FIG. 2(b) is a flowchart illustrating steps in an attribute modification process;

FIG. 3(a) shows an example of a target image represented by target image data;

FIG. 3(b) shows an example of a block image corresponding to the target image;

FIG. 8(a) shows a table for illustrating an attribute modification process according to the embodiment;

FIG. 8(b) shows a table for illustrating an attribute modification process according to a modification of the embodiment;

FIG. 10(a) shows another example of a target image;

FIG. 10(b) shows a tree structure of image regions in relation to the target image shown in FIG. 10(b); and FIG. 10(c) shows a tree structure obtained after the attribute modification process is performed on the tree structure in FIG. 10(b).

DETAILED DESCRIPTION

Figure 2A:
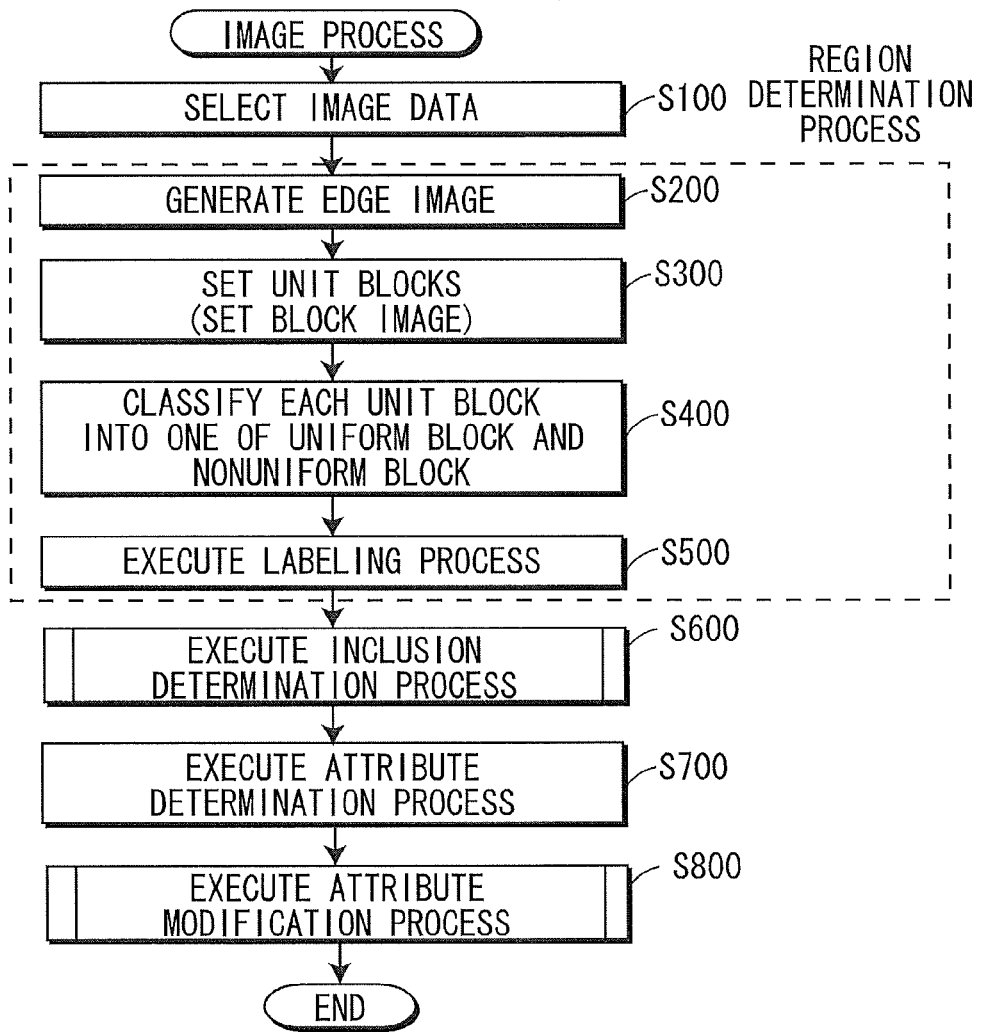
FIG. 2(a) is a flowchart illustrating steps in an image process.

The multifunction peripheral 200 includes a CPU 210; an internal storage device 240 having ROM and RAM; a printing unit 250 for printing images using a prescribed system (inkjet or laser, for example); a scanning unit 260 for reading an original using a photoelectric converting element (CCD or CMOS, for example); an operating unit 270, such as a touch panel; a communication unit 280 for communicating and exchanging data with an external device, such as a digital camera 300, a personal computer 400, or USB memory (not shown); and an external storage device 290, such as a hard disk drive or EEPROM.

The internal storage device 240 is provided with a buffer region 241 for temporarily storing various intermediate data generated when the CPU 210 performs processes. The external storage device 290 stores various computer programs 291 for controlling the multifunction peripheral 200, a determination table 292 referenced in an image process described later, and image data 293 that is subjected to the image process. The computer programs 291 may be supplied on a recording medium in a format that can be read by a computer. The recording medium may be a removable recording medium, such as a CD-ROM or a USB storage, an internal storage device built into the computer, such as ROM or RAM, or an external storage device such as a hard disk drive that is connected to the computer. The image data 293 may include image data generated by the scanning unit 260 when scanning an original or may be image data acquired from an external device via the communication unit 280. The image data 293 that is acquired from an external device may be image data generated by the digital camera 300, or image data generated by an application program installed on the personal computer 400 for creating documents or images, for example.

By executing the computer programs 291, the CPU 210 functions as an image process unit M100 for executing an image process described later. The image process unit M100 includes a region identifying unit M110, and a region attribute setting unit M130. The region identifying unit M110 further includes a region sorting unit M111, an inclusion determining unit M112, and a peripheral region generating unit M113. The region attribute setting unit M130 includes an attribute determining unit M131, and an attribute modifying unit M132. The attribute modifying unit M132 also includes a region consolidating unit M133. The processes executed by these process units will be described next in greater detail.

A-2. Image Process

The image process unit M100 executes a series of processes on image data to determine the content of an image represented by the image data. FIG. 2(a) is a flowchart illustrating steps in an image process.

In S100 at the beginning of the image process in FIG. 2, the image process unit M100 selects the image data to be subjected to the image process (target image data). In other words, the image process unit M100 prepares the image data representing an image. For example, the image process unit M100 may receive an instruction from the user via the operating unit 270 indicating the target image data and may select the specified target image data from the image data 293 stored in the external storage device 290, where the image data 293 is data representing a plurality of images.

FIG. 3(a) shows an example of a target image G represented by target image data, and FIG. 3(b) shows a block image BG corresponding to the target image G. The target image G includes a photo object PH representing a photo (occupying approximately the upper three-quarters of the target image G), a text object CH representing text, and a background portion BK for the background of the text object CH (occupying approximately the bottom one-fourth of the target image G). The target image data in the following description will be bitmap data configured of RGB pixel data. The RGB pixel data includes three component values for red (R), green (G), and blue (B) (each component value being one of 256 gradation values, for example). The component values of pixel data will be called pixel values. The image process unit M100 performs the process described below after converting the target image data to bitmap data when the target image data is in a different data format.

In S200 the region identifying unit M110 of the image process unit M100 uses the target image data to create edge image data representing an edge image. The edge image data can be obtained by applying the Sobel filter to each component value for the plurality of RGB pixels constituting the target image data. The edge image data is configured of pixel data for a plurality of pixels. The pixel data for one pixel includes R, G, and B component values. Each of R, G, B component values of one pixel in the edge image data expresses an edge strength of the corresponding pixel in the original image for the corresponding color component. More specifically, a calculated component value $S(x, y)$ for one color of a target pixel in the edge image at pixel position $(x, y)$ is calculated according to Equation 1 below using nine component values P of nine pixels corresponding to the target pixel in the target image.

$$S(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| + \left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| \quad \text{Equation (1)}$$

As shown above in Equation 1, the nine pixels are positioned on all sides of the target pixel corresponding to pixel position $(x, y)$ in the edge image. The first and second terms on the right side of Equation 1 are absolute values for the sum of values obtained by multiplying pixel values at the nine positions with corresponding coefficients. As can be seen from Equation 1, pixel data in the edge image (the edge strength of the pixels) is calculated using the difference between component values (pixel values) of adjacent first and second pixels in the target image. The edge image may be created using any of various edge detection filters, such as the Prewitt filter and Roberts filter, and is not limited to the Sobel filter.

In S300 of FIG. 2(a), the region sorting unit M111 of the region identifying unit M110 configures a plurality of unit blocks B (see FIG. 3(b)) for the edge image E represented by the edge image data. The unit blocks B are arranged as a grid in relation to the edge image E. Since the edge image E and the target image G are identical in size (have the same number of pixels both vertically and horizontally), it is possible to say that the unit blocks B are configured for the target image G. That is, each unit block B corresponds to the position of the target image G similarly to the edge image E. FIG. 3(a) shows the unit blocks B arranged in a grid shape for the target image G. A single unit block B is equivalent to the size of M×M unit pixels (where M is a predetermined natural number). Here, a unit pixel is one pixel of the edge image E (target image G), for example. As will be described later, the unit block B is the smallest unit area in the target image used for identifying a region. The M is any designed value. For example, M may be set to 10-50. The region sorting unit M111 sets a block image BG corresponding to the configuration of unit blocks B (see FIG. 3(b)).

The block image BG is configured of block pixels BP corresponding to the plurality of unit blocks B described above. The value of each block pixel BP is used to represent various information related to the corresponding unit block B, such as region identification data described later. When configuring the block image BG, the region sorting unit M111 initializes the values of all block pixels BP in the block image BG to "0".

In S400 the region sorting unit M111 classifies each of the unit blocks B as either a uniform block or a nonuniform block. For example, the region sorting unit M111 calculates an edge strength for each unit block B (region edge strength). Specifically, the region sorting unit M111 calculates the average values (ERave, EGave, and EBave) of component values (R, G, and B) for all pixels of the edge image included in the unit block B as a characteristic value indicating the region edge strength. The region sorting unit M111 classifies the unit blocks B as either uniform or nonuniform blocks by comparing the region edge strength of each unit block B to a predetermined reference. A "uniform block" is a unit block in which the region edge strength is less than the prescribed reference, while the nonuniform block is a unit block in which the region edge strength is greater than or equal to the predetermined reference. For example, the region sorting unit M111 compares the average values ERave, EGave, and EBave indicating the region edge strength to reference values ETr, ETg, and ETb preset for each of these values. If ERave<ETr, EGave<ETg, and EBave<ETb, the region sorting unit M111 classifies the unit block B being processed as a uniform block. Conversely, if even one of the ERave≥ETr, EGave≥ETg, and EBave≥ETb is satisfied, the region sorting unit M111 classifies the target unit block B as a nonuniform block.

The region sorting unit M111 records the classification result for each unit block B in the pixel value of the block pixel BP corresponding to the unit block B. FIG. 3(b) shows an example of the block image BG after classifying the unit blocks B. The pixel value "0" indicates that the unit block B corresponding to the block pixel BP was classified as a nonuniform block, while the pixel value "1" indicates that the unit block B corresponding to the block pixel BP was classified as a uniform block.

In S500 the region sorting unit M111 executes a labeling process to sort all of the unit blocks B into a plurality of groups and to assign a region identifier to each group.

Figure 4A:
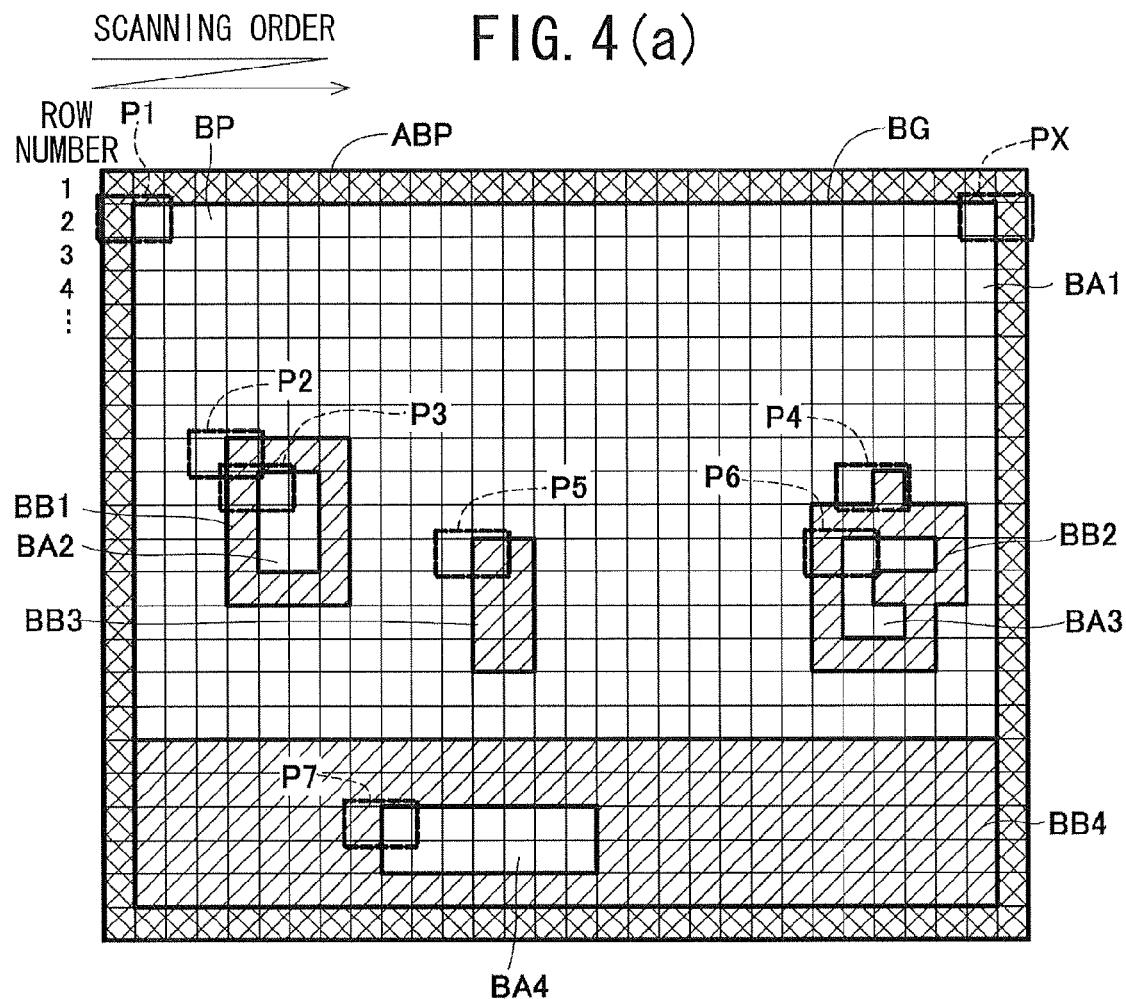
FIG. 4(a) shows an example of the block image for illustrating a labeling process.
Figure 4B:
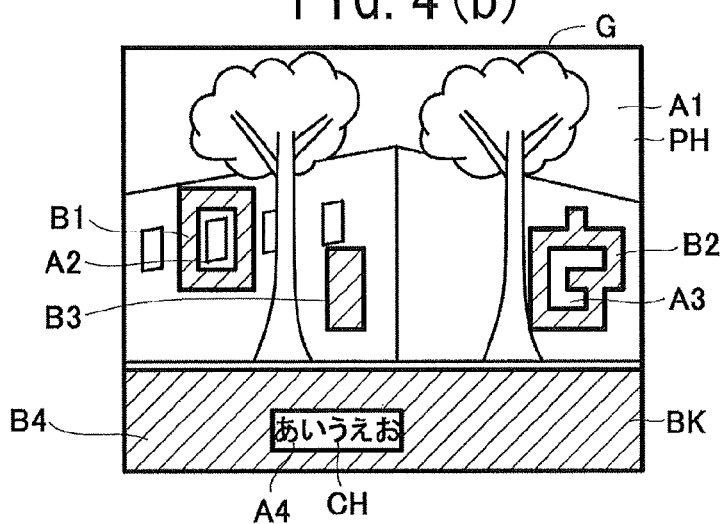
FIG. 4(b) shows an example of identified image regions in the target image for illustrating the labeling process.

FIGS. 4(a) and 4(b) are explanatory diagrams illustrating the labeling process. FIG. 4(a) shows an example of the block image BG following the labeling process. FIG. 4(b) shows identified image regions in the target image G through the labeling process. The region sorting unit M111 groups together pluralities of contiguous block pixels BP in the block image BG whose pixel values are "0" and groups together pluralities of contiguous block pixels BP whose pixel values are "1". The region sorting unit M111 updates the value of each block pixel BP so that block pixels BP belonging to the same group have the same value and block pixels BP belonging to different groups have different values. This process results in identifying image regions of the block image BG configured of block pixels BP having the same pixel value.

In the example shown in FIG. 4(a), eight image regions BA1-BA4 and BB1-BB4 have been identified in the block image BG. To avoid confusion, pixel values for the block pixels BP have not been included in FIG. 4(a), but each block pixel BP in the same image region has the same value. Image regions A1-A4 and B1-B4 are identified in the target image G such that the image regions A1-A4 and B1-B4 correspond to the image regions BA1-BA4 and BB1-BB4 (see FIG. 4(a)) that are identified in the block image BG. Here, smallest unit of the image regions A1-A4 and B1-B4 are the unit block B when the image regions A1-A4 and B1-B4 are identified. As described above, pixel values in the block image BG following the labeling process are region identifiers assigned to each unit block B for identifying the image regions A1-A4 and B1-B4 in the target image G. Thus, the data in the block image BG may be thought of as data for region identifiers used to identify image regions in the target image G.

Image regions identified in the target image G are either nonuniform or uniform regions. A nonuniform region is configured of unit blocks B classified as nonuniform blocks, while a uniform region is configured of unit blocks B classified as uniform blocks. In the example of FIG. 4(b), the shaded image regions B1-B4 are uniform regions, while the unshaded image regions A1-A4 are nonuniform regions. Contiguous nonuniform blocks are identified as a single image region (a nonuniform region), while similarly contiguous uniform blocks are identified as a single image region (uniform region). Consequently, nonuniform regions are surrounded by uniform regions and uniform regions are surrounded by nonuniform regions, excluding regions positioned along the outer edge of the target image G (the image edge; regions A1 and B4 in the example of FIG. 4(b)).

Of the image regions within the target image G in the example of FIG. 4(b), the image region A1 is identified as a region corresponding to the photo object PH, the image region A4 as a region corresponding to the text object CH, and the image region B4 as a region corresponding to the background portion BK. Further, the uniform regions B1, B2, and B3 are identified as regions included in the image region A1; the image region A2 is identified as a region included in the uniform region B1, and the image region A3 is identified as a region included in the uniform region B2.

In S600 of FIG. 2(a), the inclusion determining unit M112 of the region identifying unit M110 executes an inclusion determination process. The inclusion determination process serves to determine relationships of inclusion among the plurality of image regions A1-A4 and B1-B4 identified in the target image G and to create a tree structure representing these relationships. FIG. 2(b) is a flowchart illustrating steps in an attribute modification process.

In S610 of FIG. 2(b), the peripheral region generating unit M113 configures (adds) peripheral block pixels ABP around the periphery of the block image BG. The plurality of peripheral block pixels ABP, shaded with cross-hatching in FIG. 4(a), are set to follow the outer edge of the block image BG, forming a border region that encircles the entire block image BG. The peripheral block pixels ABP are coupled with block pixels BP corresponding to a uniform region that were positioned along the outer edge of the block image BG before the peripheral block pixels ABP were added. That is, in the example shown in FIG. 4(a), the peripheral region generating unit M113 couples peripheral block pixels ABP with block pixels BP constituting the image region BB4 (FIG. 4(a)) corresponding to the image region B4 (FIG. 4(b)) positioned on the outer edge of the target image G. Next, the inclusion determining unit M112 sets the values (region identifiers) of the peripheral block pixels ABP to the same values in the image region BB4. Consequently, the peripheral region formed by the peripheral block pixels ABP and the image region BB4 are identified as a single region. Adding the peripheral block pixels ABP is equivalent to generating a border-like peripheral region having a width of one unit block B as a uniform region surrounding the entire target image G. The newly generated peripheral region differs from the regions of the original target image G. In the following description of the inclusion determination process, the block image BG will be used to signify the block image BG in which the peripheral block pixels ABP have been added.

In S620 the inclusion determining unit M112 selects a block pixel according to a scanning order (selection order). Specifically, the inclusion determining unit M112 sets one row at a time as the scanning target according to the order of row numbers indicated in FIG. 4(a) (that is, according to the order from top to bottom). Next, the inclusion determining unit M112 sequentially selects one block pixel at a time from among the pixels in the row currently selected as the scanning target, proceeding in a direction parallel to the row (from left to right in FIG. 4(a), for example). After all block pixels in one row have been selected, the inclusion determining unit M112 sets the scanning target to the row having the next row number (the next adjacent row in the column direction). Accordingly, sequentially selecting (scanning) block pixels in the block image BG is equivalent to sequentially selecting unit blocks B in the target image G.

In S630 the inclusion determining unit M112 determines whether the region identifier of the selected block pixel differs from the region identifier of the next adjacent block pixel in the scanning direction (the next block pixel to be selected). In other words, the inclusion determining unit M112 compares the region identifier for the $N^{th}$ block pixel in the scanning order (hereinafter referred to as the $N^{th}$ identifier) to the region identifier for the $(N+1)^{th}$ block pixel (hereinafter referred to as the $(N+1)^{th}$ identifier) and determines whether the $N^{th}$ identifier differs from the $(N+1)^{th}$ identifier.

If the region identifier for the selected block pixel ($N^{th}$ identifier) differs from the region identifier for the next adjacent block pixel (($N+1)^{th}$ identifier; S630: YES), in S640 the inclusion determining unit M112 determines whether a relationship of inclusion has already been acquired for the image region corresponding to the $N^{th}$ identifier and the image region corresponding to the $(N+1)^{th}$ identifier. That is, the inclusion determining unit M112 determines whether a tree structure indicating the relationship of inclusion between the image region identified by the $N^{th}$ identifier and the image region corresponding to the $(N+1)^{th}$ identifier has been created. If a relationship of inclusion between these two image regions has not yet been acquired (S640: NO), in S650 the inclusion determining unit M112 acquires the relationship of inclusion between these image regions. More specifically, the inclusion determining unit M112 determines whether the image region corresponding to the $(N+1)^{th}$ identifier is included in the image region identified by the $N^{th}$ identifier and creates (or update) the tree structure representing this relationship. In other words, the relationship of inclusion indicates that the image region corresponding to the $(N+1)^{th}$ identifier is disposed inside of the image region identified by the $N^{th}$ identifier. Subsequently, the inclusion determining unit M112 advances to S660.

On the other hand, if the $N^{th}$ identifier is identical to the $(N+1)^{th}$ identifier (S630: NO) or if the relationship of inclusion has already been acquired for the image region corresponding to the $N^{th}$ identifier and the image region corresponding to the $(N+1)^{th}$ identifier (S640: YES), the inclusion determining unit M112 advances to S660 without acquiring a relationship of inclusion. That is, once the inclusion determining unit M112 determines the relationship of inclusion between the image regions corresponding to the $N^{th}$ and $(N+1)^{th}$ identifier, the inclusion determining unit M112 does not update the relationship of inclusion between the image regions corresponding to the $N^{th}$ and $(N+1)^{th}$ identifier.

In S660 the inclusion determining unit M112 determines whether all block pixels have been selected. If there remain any block pixels that have not been selected (S660: NO), the inclusion determining unit M112 returns to S620, selects a new block pixel according to the scanning order, and repeats the process in S630-S650 described above. However, when all block pixels have been selected (S660: YES), the inclusion determining unit M112 ends the inclusion determination process.

Here, a specific example will be given in which the block image BG shown in FIG. 4(a) is the scanning target. When comparing the region identifiers for the two block pixels contained in the dotted line P1 in the second row of block pixels, the inclusion determining unit M112 acquires the relationship of inclusion between the image region BB4 (region coupled with the peripheral block pixels ABP) and the image region BA1 in the block image BG. That is, the inclusion determining unit M112 acquires the relationship of inclusion between the image region B4 and image region A1 in the target image G. On the other hand, when subsequently comparing region identifiers for the two block pixels included in the dotted line PX in the same second row, the inclusion determining unit M112 does not acquire the relationship of inclusion because the relationship between the image region BB4 and image region BA1 of the block image BG has already been acquired.

Figure 5:
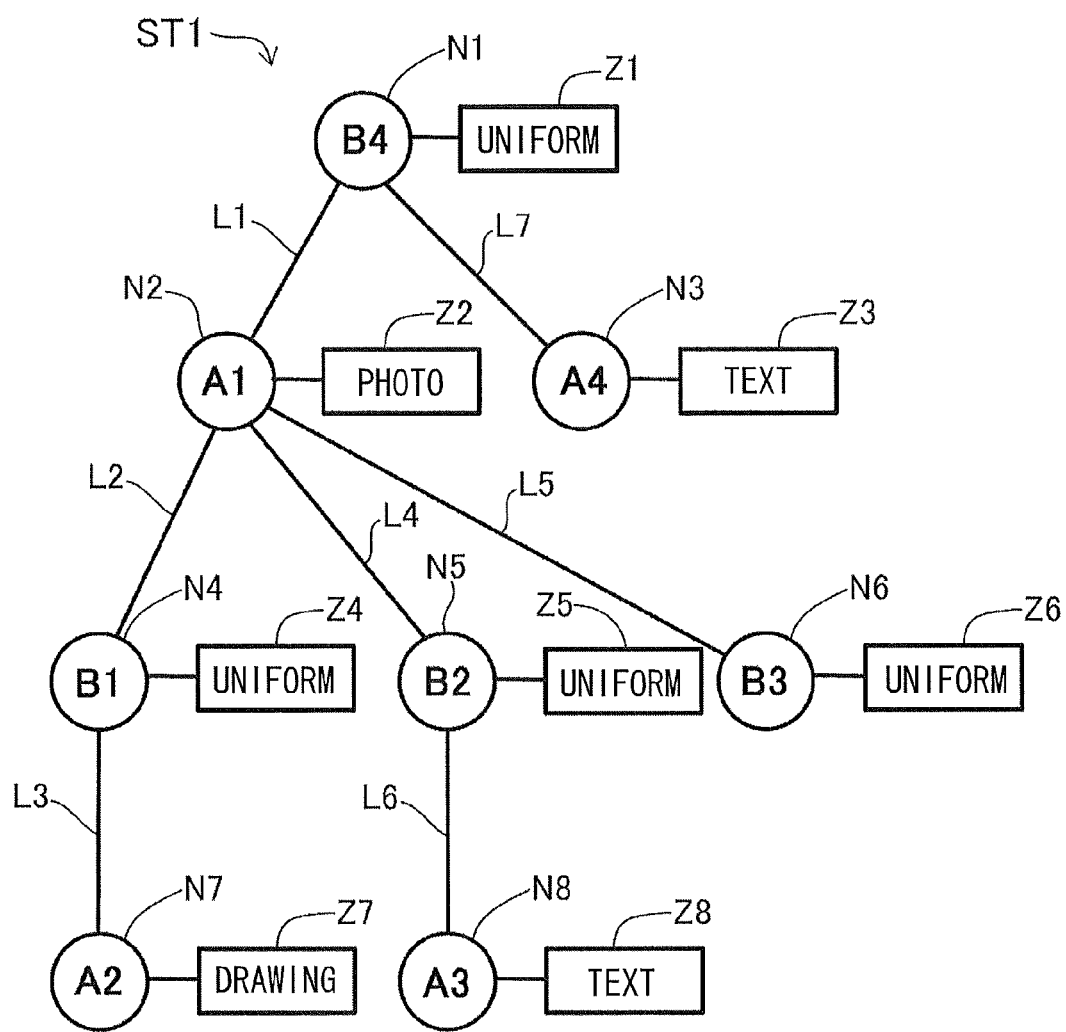
FIG. 5 shows an example of a tree structure indicating relationships of inclusion.

FIG. 5 shows an example of a tree structure ST1 indicating relationships of inclusion. The tree structure ST1 is acquired when executing the inclusion determination process on the block image BG shown in FIG. 4(a). The tree structure ST1 includes nodes N1-N8 indicated by circles, and links L1-L7 connecting to nodes. Attribute data Z1-Z8 associated with each node is generated in an attribute determination process described later. The tree structure ST1 shows the relationships of inclusion between the image regions A1-A4 and the image regions B1-B4 identified in the target image G shown in FIG. 4(b). Each node corresponds to the region whose symbol has been added inside the node. A link indicates that the two regions corresponding to the two nodes positioned on both ends of the link have a relationship of inclusion. More specifically, a region (hereinafter referred to as "parent region") corresponding to the node (hereinafter referred to as "parent node") positioned at the upper end of the link in FIG. 5 includes the region (hereinafter referred to as "child region") corresponding to the node (hereinafter referred to as "child node") positioned at the lower end of the link in FIG. 5. In other words, the child region is disposed inside of the parent region.

Here, the node corresponding to the image region that includes image regions corresponding to all other nodes will be called the topmost node. In the example of FIG. 5, the topmost node is node N1. A child node of the topmost node will be referred to as a second-layer node, a child node of a second-layer node will be referred to as a third-layer node, and so on.

When comparing the pairs of block pixels indicated by dotted lines P1-P7 in FIG. 4(a) in the inclusion determination process, the inclusion determining unit M112 acquires relationships of inclusion indicated by the links L1-L7 to create the tree structure ST1.

After generating the tree structure ST1, in S700 of FIG. 2(a), the attribute determining unit M131 of the region attribute setting unit M130 executes the attribute determination process. The attribute determination process is performed to determine attributes of the nonuniform regions A1-A4 among all image regions identified in the target image G. The attribute of the image region is determined based on an image in the image region, as described below.

Figures 6A, 6B:
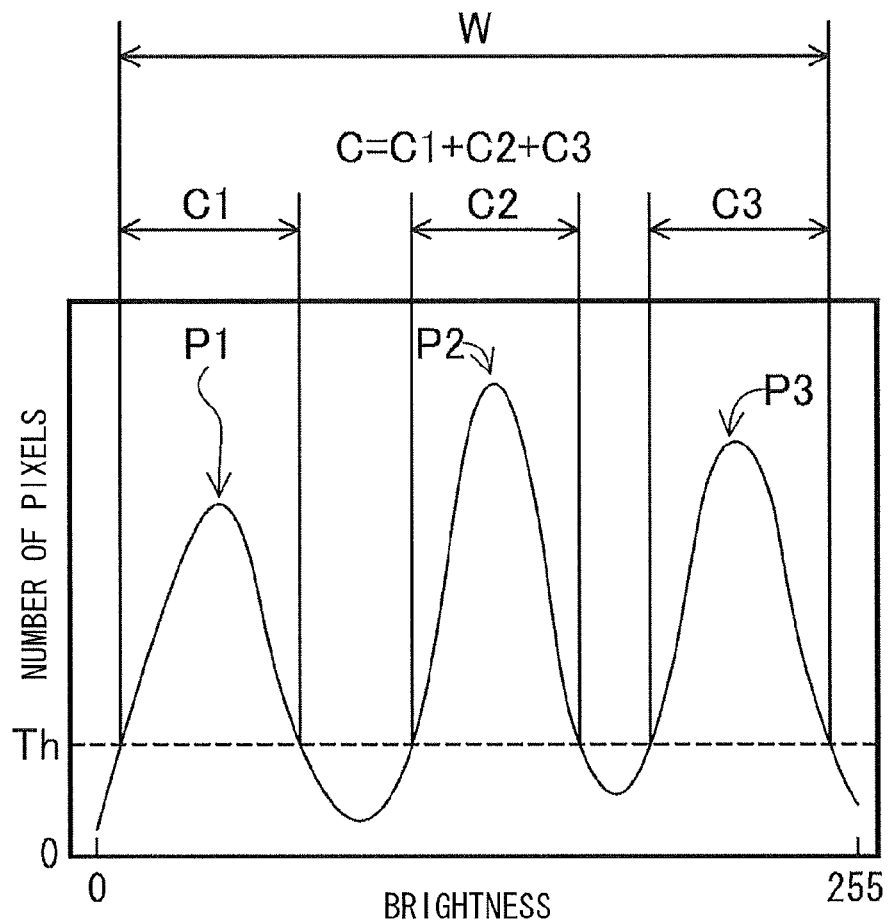
FIG. 6(a) shows an example of a histogram representing a brightness distribution.
FIG. 6(b) shows a determination table used for determining an attribute of a target regions.

FIGS. 6(a) and 6(b) are explanatory diagrams illustrating the attribute determination process. The attribute determining unit M131 determines the attribute of the image region being processed (target region) based on the pixel density D, distribution width W, and color number C. First, the attribute determining unit M131 sorts (performs thresholding on) the pixels constituting the target region into object pixels and background pixels. For example, the attribute determining unit M131 classifies pixels in the target region (nonuniform region) as background pixels when their color difference from pixels in the neighboring uniform region is smaller than a prescribed reference. The attribute determining unit M131 then sets all pixels constituting the target region that were not classified as background pixels as object pixels.

The pixel density D indicates the percentage of object pixels occupying the target region and is represented by the equation D=No/Na=No/(No+Nb). Here, No represents the number of object pixels, Na the total number of pixels constituting the target region, and the Nb the number of background pixels. Since the right side of the equation can clearly be rewritten as $1/\{1+(Nb/No)\}$, the pixel density D can be viewed as a characteristic value corresponding to the ratio of the number No of object pixels to the number Nb of background pixels.

The attribute determining unit M131 further calculates a brightness distribution for object pixels among the pixels constituting the target region. FIG. 6(a) shows an example of a histogram representing the brightness distribution. The histogram in FIG. 6(a) is produced by plotting pixel counts on the vertical axis for each of the 256 brightness values Y on the horizontal axis. The attribute determining unit M131 calculates the brightness value Y using RGB pixel data (R, G, and B) in an equation such as $Y=((0.298912\times R)+(0.586611\times G)+(0.114478\times B))$.

The distribution width W may be, for example, the difference between the minimum value and maximum value of brightness values Y for which the pixel count exceeds a threshold Th2, as shown in the histogram of FIG. 6(a). The distribution width W is a characteristic value representing a characteristic of the brightness distribution and can be thought to indicate the width of the distributed range of brightness values.

As shown in FIG. 6(a), the color number C in the embodiment is the number of brightness values Y for which the pixel count exceeds the threshold Th2. Since the color of these pixels differs for different brightness values Y, the number of different brightness values Y (the number of types of brightness values Y) represents the number of colors (the number of types of colors). Hence, the color number C can be considered a characteristic value indicating the number of different brightness values Y.

The attribute determining unit M131 identifies the attribute of the target region based on the pixel density D, the distribution width W, and the color number C described above. For example, the attribute determining unit M131 determines whether each of the pixel density D, the distribution width W, and the color number C are greater than or equal to corresponding references Dth, Wth, and Cth. Using these determination results, the attribute determining unit M131 references a determination table 292 shown in FIG. 6(b) to determine the attribute of the target region. In the embodiment, the attribute determining unit M131 determines whether the attribute of the target region (each of the nonuniform regions A1-A4) is "photo," "text," or "drawing." Here, "drawing" includes an illustration, table, diagram, pattern, "text" includes at least one letter, and "photo" includes a photographic image. Using the results of the attribute determination process, the attribute data Z1-Z8 can be associated with each node (each corresponding image region) in the tree structure ST1 (see FIG. 5).

As is clear from the determination table 292, the attribute of a target region is determined to be "text" in the following two cases.

(1-1) Color number C<Cth and pixel density D<Dth
(1-2) Distribution width W<Wth and color number C≥Cth and pixel density D<Dth The attribute of the target region is determined to be "drawing" in the following case.

(2-1) Color number C<Cth and pixel density D≥Dth

Similarly, the attribute of the target region is determined to be "photo" in the following two cases.

(3-1) Distribution width W≥Z Wth and color number C≥Cth
(3-2) Distribution width W<Wth and color number C≥Cth and pixel density D≥Dth Since the attribute of a target region is determined to be "text" for case (1-1) in the embodiment, the attribute of an image region having typical text characteristics, i.e., a relatively low color number C and a relatively low pixel density D, can be accurately identified. Further, since the attribute of a target region is determined to be "drawing" for case (2-1) in the embodiment, the attribute of an image region having typical drawing characteristics, i.e., a relatively low color number C and a relatively high pixel density D, can be accurately identified. Further, since the attribute of a target region is determined to be "photo" for case (3-1) in the embodiment, the attribute of an image region having typical photo characteristics, i.e., a relatively large distribution width W and a relatively high color number C, can be accurately identified.

Figure 7:
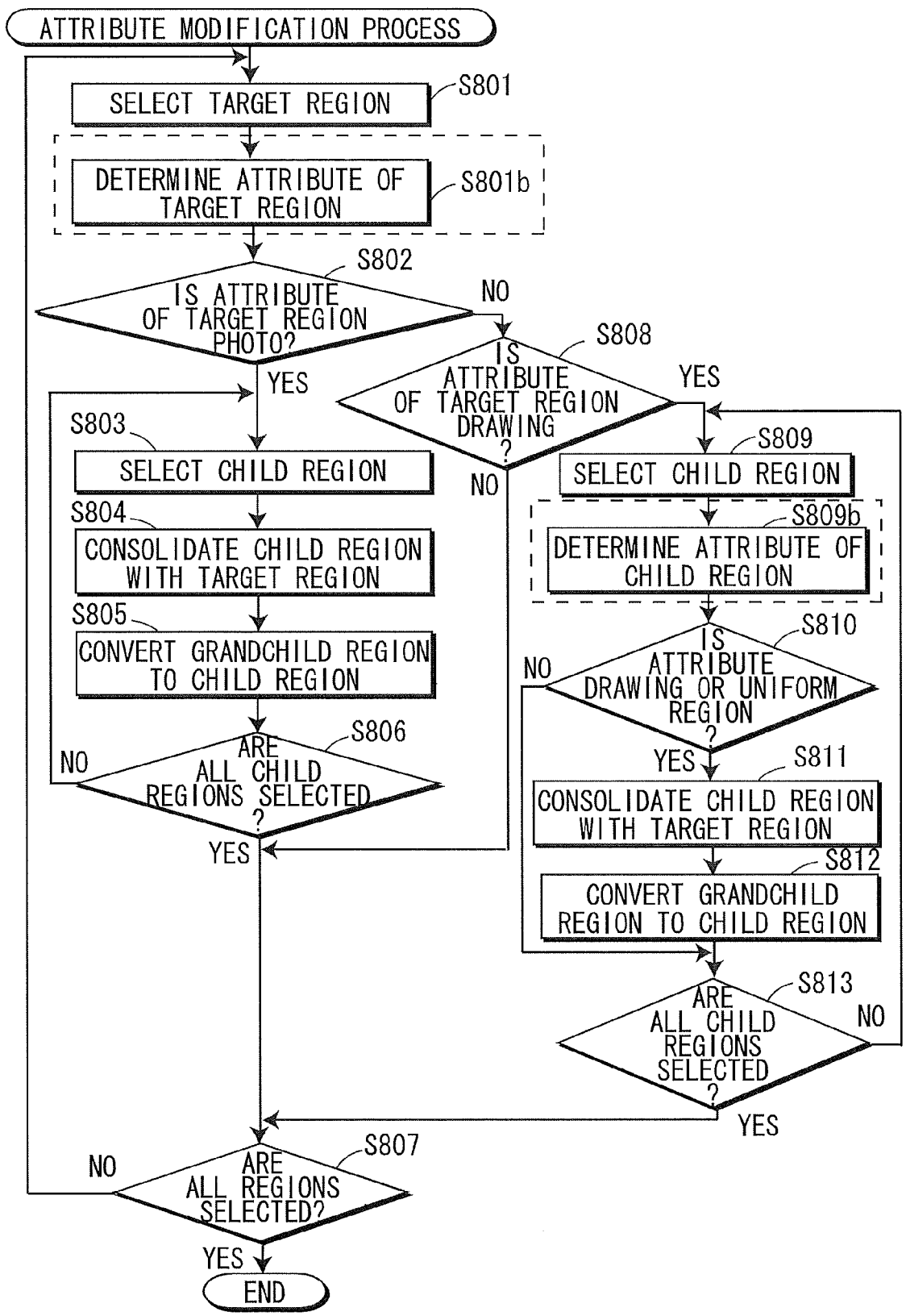
FIG. 7 is a flowchart illustrating steps in an attribute modification process.

In S800 of FIG. 2(a), the attribute modifying unit M132 of the region attribute setting unit M130 executes an attribute modification process. FIG. 7 is a flowchart illustrating steps in the attribute modification process. Note that steps S801b and S809b encircled by dotted lines in FIG. 7 are executed in a variation of the embodiment. Therefore, the attribute modification process will be described first without the processes in S801b and S809b.

In S801 of FIG. 7, the attribute modifying unit M132 references the tree structure ST1 and selects an image region to be processed (target region). Specifically, the attribute modifying unit M132 sequentially selects target regions from the image regions corresponding to the nodes N1-N8 in the tree structure ST1 in an order beginning from the topmost node.

In S802 the attribute modifying unit M132 determines whether the attribute of the target region is "photo." If the attribute of the target region is "photo" (S802: YES), in S803 the attribute modifying unit M132 selects a child region from the target region.

In S804 the attribute modifying unit M132 consolidates the selected child region with the target region. Here, consolidating two regions signifies that two regions identified as different regions (two regions having different region identifiers) are now identified as a single region (a region identified by a single region identifier). The attribute of the single consolidated region is set to the attribute of the parent region prior to consolidation.

In S805 the attribute modifying unit M132 converts a child region of the child region consolidated with the target region (i.e., a grandchild region with respect to the target region) to a child region of the target region. For example, when the image region A1 corresponding to the node N2 in FIG. 5 is the target region, since the attribute of the image region A1 is "photo," in S803 the attribute modifying unit M132 selects the uniform region B1 (corresponding to the node N4), for example, as the child region, in S804 consolidates the image region A1 and uniform region B1, and in S805 converts the image region A2 (corresponding to the node N7), which was a child region of the uniform region B1, to a child region of the image region A1.

In S806 the attribute modifying unit M132 determines whether all child regions of the target region have been selected. While there remain any unselected child regions (S806: NO), the attribute modifying unit M132 returns to S803, selects a new child region, and repeats the process in S804-S805 described above. When all child regions have been selected (S806: YES), the attribute modifying unit M132 advances to S807.

On the other hand, when the attribute of the target region is determined not to be "photo" (S802: NO), in S808 the attribute modifying unit M132 determines whether the attribute of the target region is "drawing." If the attribute of the target region is not "drawing" (S808: NO), the attribute modifying unit M132 advances to S807. When the attribute of the target region is "drawing" (S808: YES), in S809 the attribute modifying unit M132 selects a child region of the target region.

In S810 the attribute modifying unit M132 determines whether the attribute of the selected child region is either "drawing" or "uniform region." If the attribute is neither "drawing" nor "uniform region" (S810: NO), the attribute modifying unit M132 advances to S813 described later.

However, when the attribute of the child region is either "drawing" or "uniform region" (S810: YES), in S811 the attribute modifying unit M132 consolidates the selected child region with the target region.

In S812 the attribute modifying unit M132 converts the child region of the child region consolidated with the target region (i.e., converts the grandchild region with respect to the target region) to a child region of the target region, and subsequently advances to S813.

In S813 the attribute modifying unit M132 determines whether all child regions of the target region have been selected. When there remain child regions that have not been selected (S813: NO), the attribute modifying unit M132 returns to S809, selects a new child region, and repeats the process in S810-S812 described above. When all child regions have been selected (S813: YES), the attribute modifying unit M132 advances to S807.

In S807 the attribute modifying unit M132 determines whether all image regions have been selected to be the target region. If there remain any image regions that have not been selected (S807: NO), the attribute modifying unit M132 returns to S801, selects a new image region to be the target region, and repeats the above process. When all image regions have been selected (S807: YES), the attribute modifying unit M132 ends the attribute modification process.

FIG. 8(a) shows a table for illustrating the attribute modification process. As shown in FIG. 8(a), when the attribute of the parent region is "photo," in the attribute modification process of the embodiment the attribute modifying unit M132 consolidates all child regions with the parent region, regardless of what attribute the child region possesses. If the attribute of the parent region is "drawing," the attribute modifying unit M132 consolidates the child region with the parent region when the attribute of the child region belongs to a specific type ("drawing" or "uniform region" in the embodiment). When a child region is consolidated with its parent region, the consolidated child region (after consolidation, the child region is no longer independent, but is part of the parent region) takes on the same attribute as the parent region. In other words, if the attribute of the child region differs from the attribute of the parent region, the attribute of the child region is converted to the same attribute as the parent region when consolidating the two regions. Further, when the attribute of the parent region is "text," the attribute modifying unit M132 does not consolidate the child region with the parent region, regardless of what attribute the child region possesses.

Figure 9A:
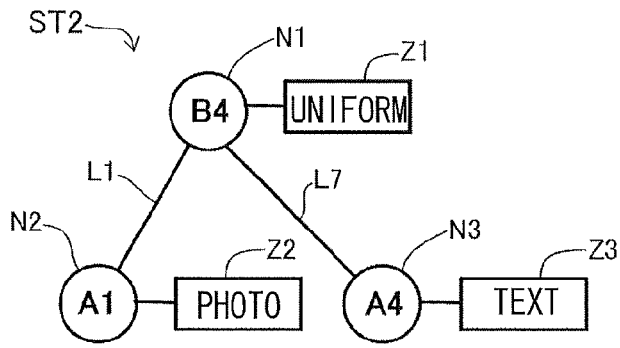
FIG. 9(a) shows a tree structure obtained after the attribute modification process is performed on the tree structure in FIG. 5.
Figure 9B:
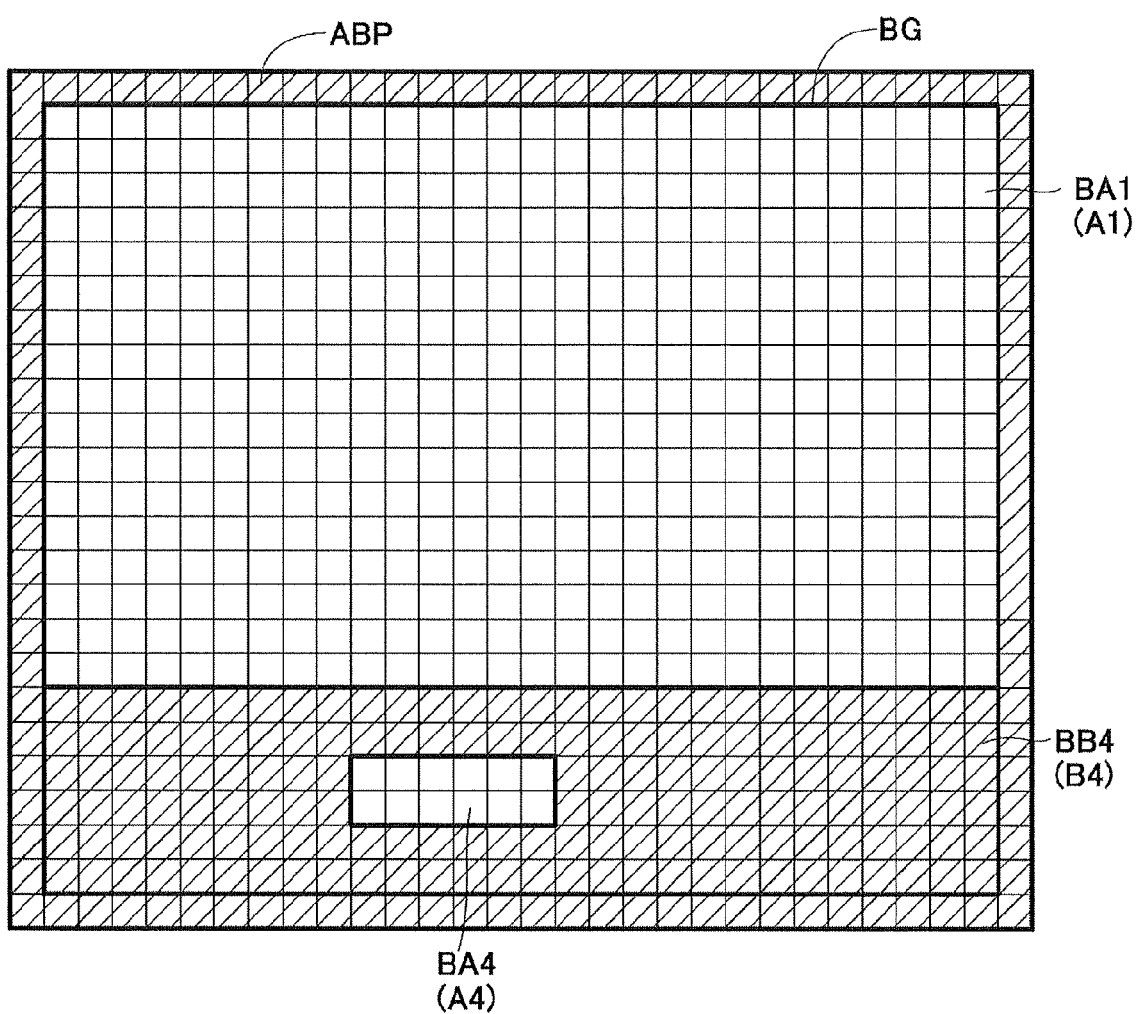
FIG. 9(b) shows a block image corresponding to the tree structure shown in FIG. 9(a)

FIGS. 9(a) and 9(b) are drawings showing sample results of the attribute modification process. Through the attribute modification process, the tree structure ST1 in FIG. 5 is converted to a tree structure ST2, shown in FIG. 9(a). FIG. 9(b) indicates the block image BG corresponding to the tree structure ST2 of FIG. 9(a). The image regions BA1, BB4, and BA4 identified in the block image BG correspond to the image regions A1, B4, and A4 identified in the target image G and indicated in parentheses in FIG. 9(b). As shown in FIGS. 9(a) and 9(b), the image regions included in the image region A1 of the target image G, which has the attribute "photo" (i.e., the child regions B1, B2, and B3 and grandchild regions A2 and A3; see FIGS. 4(a), 4(b) and 5) are all consolidated with the image region A1 to form a single region.

FIGS. 10(a)-10(c) are drawings showing another sample results of the attribute modification process. FIG. 10(a) shows an example of the target image G. The target image G in this example includes a background image BG1 and a drawing D1. The drawing D1 includes a first graph D2, a second graph D3, text C1, and a background image BG2 surrounding the objects D2, D3, and C1. When performing the process in S200-S700 of the image process described above on the target image G, the image process unit M100 creates a tree structure ST3, such as that shown in FIG. 10(b). The tree structure ST3 identifies a uniform region corresponding to the background image 1302 (node N13 having the attribute data Z13 ("uniform region")) as a region included in a nonuniform region corresponding to the drawing D1 (node N12 having the attribute data Z12 ("drawing")). The regions identified as being included in the uniform region corresponding to the background image BG2 are the nonuniform region corresponding to the first graph D2 (node N14 having the attribute data Z14 ("drawing")), the nonuniform region corresponding to the second graph D3 (node N15 having the attribute data Z15 ("drawing")), and the nonuniform region corresponding to the text C1 (node N16 having the attribute data Z16 ("text")).

The tree structure ST3 shown in FIG. 10(b) is converted to a tree structure ST4 shown in FIG. 10(c) through the attribute modification process. As described above, prior to executing the attribute modification process, a nonuniform region having the attribute "drawing" (the image region corresponding to the drawing D1) includes one child region (a uniform region corresponding to the background image BG2) and three grandchild regions (nonuniform regions corresponding to the objects D2, D3, and C1). Of these child and grandchild regions, regions with the attribute "drawing" and "uniform region," i.e., the uniform region corresponding to the background image BG2 and the nonuniform regions corresponding to the objects D2 and D3, are consolidated with the image region corresponding to the drawing D1. However, image regions having the attribute "text," i.e., the nonuniform region corresponding to the text C1, is not consolidated with the image region corresponding to the drawing D1 but is left as an independent child region.

After completing the attribute modification process, the image process unit M100 ends the image process. After the image process is completed, the image process unit M100 may execute an image correction process on each region of the image whose attribute has been identified based on the identified attribute. For example, the image process unit M100 may perform processes to correct white balance, brightness, and the like in image regions identified as photographs, and may perform processes to enhance sharpness and contrast in image regions identified as text.

By setting attributes of child regions using the attributes of the parent regions, the multifunction peripheral 200 of the embodiment can set suitable attributes for the child regions. If regions are identified and attributes are determined without consideration for relationships of inclusion among regions, incorrect determinations may be made when an image region that should be identified as a photo contains uniform regions or regions having characteristics of text or drawings, as in the example shown in FIG. 4(b) in which the uniform regions B1, B2, and B3 and nonuniform regions A2 and A3 having the attributes "drawing" and "text," respectively, are identified within the image region A1 corresponding to the photo object PH. Thus, all child regions are consolidated with parent regions determined to have the attribute "photo" in the embodiment, i.e., all regions contained in an image region determined to have the attribute "photo" are consolidated with that image region. Since the attributes of regions contained in an image region whose attribute is determined to be "photo" are all converted to "photo," the image processor of the embodiment can more accurately set attributes for image regions while reducing the number of incorrect determinations described above.

In some cases, as in the example shown in FIGS. 10(a)-10(c), a region having the attribute "drawing" or a uniform region are often identified within a region whose attribute should be "drawing." In such cases, it is likely more appropriate to identify these regions as a single region, because there is little difference in separately identifying them as parent and child regions. In the embodiment, regions having the attribute "drawing" or "uniform" that are contained within a parent region whose attribute is identified as "drawing" are consolidated with the parent region. Accordingly, the attributes of child regions identified as "drawing" and "uniform" that are included in an image region (parent region) having an attribute identified as "drawing" are identified as the same region as the parent region identified as "drawing", thereby appropriately identifying these image regions and setting their attributes.

In some cases, as in the example shown in FIGS. 10(a)-10(c), a region having the attribute "text" or "photo" is often contained within a region whose attribute should be "drawing." In such cases, it is likely that "drawing" objects, such as tables or diagrams, includes a "text" object or a "photo" object. Since the child regions having attributes "text" and "photo" should be left as child regions rather than being consolidated with the parent region in these cases, the multifunction peripheral 200 of the embodiment can more appropriate set inclusion relationships of image regions and attributes for those regions.

In the embodiment, a child region is not consolidated with its parent region when the attribute of the parent region is "text," regardless of what attribute the child region possesses. In other words, the attribute of the child region is not modified when the attribute of the parent region is "text." For images representing newspapers, magazines and the like, there is a high probability that a region with the attribute "text" will contain regions with the attributes "photo" and "drawing." In such cases, child regions having attributes "drawing" and "photo" are left as child regions rather than being consolidated with their parent region whose attribute is "text," thereby more accurately determining the inclusion relationships among image regions and their attributes.

Further, if the attribute of a parent region is "photo," the multifunction peripheral 200 of the embodiment changes the attribute of grandchild regions to "photo," as well. By setting attributes for grandchild regions based on the attribute of the parent region in this way, it is possible to more suitably set the attributes for grandchild regions.

In the embodiment, peripheral block pixels ABP are added in the inclusion determination process so as to surround the periphery of the block image BG, and the multifunction peripheral 200 generates the tree structure ST1 so that the image formed by consolidating the peripheral block pixels ABP and the image region B4 is the topmost region (the region containing all other image regions). This is equivalent to generating a new ring-like region having a width of one unit block B around the periphery of the target image G. Consequently, a single tree structure ST1 may be used to accurately represent the inclusion relationships among a plurality of regions identified in the target image G.

In the embodiment, the multifunction peripheral 200 configures a plurality of unit blocks B in the target image G and divides the target image into a plurality of image regions having units of unit blocks B. The multifunction peripheral 200 assigns the same region identifier to the unit blocks B (block pixels BP) constituting the same region in order to identify the plurality of regions. Next, the multifunction peripheral 200 generates the tree structure ST1 by sequentially scanning the plurality of unit blocks B one row at a time and sequentially comparing the $N^{th}$ (where N is a natural number) identifier of the $N^{th}$ unit block B in the scanning order to the $(N+1)^{th}$ identifier of the $(N+1)^{th}$ unit block B, thereby quickly and accurately identifying relationships of inclusion.

B. Variations of the Embodiment

While the invention has been described in detail with reference to the embodiment thereof, it would be apparent to those skilled in the art that various changes and modifications may be made therein without departing from the scope of the invention.

(1) In the attribute modification process of the embodiment described above, child regions having the attribute "photo" are left unchanged when their parent region has the "drawing" attribute (FIG. 8(a)), but the attribute for a child region may be changed from "photo" to "text" when the parent region has the drawing attribute (FIG. 8(b)). There is a high probability that a region with the attribute "drawing," such as a region having a table, includes a child region with the "text" attribute, but the probability is low that the region includes a child region with the "photo" attribute. In such cases, it is conceivable that the attribute "photo" was incorrectly identified for the child region and the correct attribute of the child region is "text." For these situations, the multifunction peripheral 200 of the embodiment correctly modifies the attributes of child regions based on the attribute of their parent region, thereby more accurately setting the attributes for child regions.

(2) In the embodiment, the multifunction peripheral 200 performs the attribute modification process after executing the attribute determination process in S700 of FIG. 2(a), but the multifunction peripheral 200 may instead perform the attribute modification process without executing the attribute determination process. In this case, steps S801b and S809b encircled by dotted lines in FIG. 7 may be added to the attribute modification process after steps S801 and S809, respectively. In S801b, the CPU 201 determines the attribute of a target region. In S809b, the CPU 201 determines the attribute of a child region. Through these processes (S801B and S809B), the image process unit M100 can determine the attribute of a target region or a child region while modifying the tree structure ST1. If the attribute of the parent region is "photo," for example, the image process unit M100 can consolidate the child region and parent region without determining the attribute of the child region. This method reduces the overall process load in the image process, making it possible to identify image regions and set their attributes more efficiently.

(3) The attribute determining unit M131 may employ any of various methods for determining the attribute of nonuniform image regions in addition to the method described in the embodiment. For example, the attribute determining unit M131 may determine whether the attribute is "text" through pattern matching using prepared character images.

(4) In the embodiment, the region attribute setting unit M130 sets the attribute for a nonuniform image region to one of the three attributes "photo," "drawing," and "text." However, the region attribute setting unit M130 may instead employ only two types of attributes, where the first attribute represents either "photo" or "drawing" and the second attribute represents "text." In this case, when the parent region has the first attribute representing either "photo" or "drawing," the child region may be consolidated with the parent region, regardless of what attribute the child region possesses. Alternatively, one of the attributes "photo" or "drawing" may simply be omitted from the three types described in the embodiment. In general, the region attribute setting unit M130 may set the attributes of image regions from among a plurality of types of attributes, including one type of attribute that represents at least one of "photo" and "drawing."

(5) In the inclusion determination process, the region identifying unit M110 adds the peripheral block pixels ABP to the block pixels BP. However, instead of adding the peripheral block pixels ABP, the region identifying unit M110 may generate a plurality of tree structures for a single target image G.

(6) The image processor implementing the image processes described in the embodiment is not limited to the multifunction peripheral 200 in the embodiment, and may be configured of another type of device, such as a computer built into a printer, a digital camera, a scanner, or other image-related device; a common personal computer; or a server connected to a network. Alternatively, the functions of the image process unit M100 may be divided among a plurality of computers that can communicate over a network so that together the computers can provide all necessary functions (the technology for this type of computer system is also referred to as cloud computing).

(7) Part of the process implemented in hardware in the embodiment may be replaced with software processes, while conversely part of the processes implemented in software may be replaced with a hardware configuration.

What is claimed is:

1. An image processing device comprising:
   a processor; and
   a memory storing computer readable instructions therein, the computer-readable instructions, when executed by the processor, causing the image processing device to perform:
   preparing image data representing an image;
   identifying a first region in the image and a second region disposed inside of the first region;
   determining an attribute of the first region to be one of a plurality of attributes, the plurality of attributes including a first type attribute and a second type attribute, the first type attribute indicating one of photo and drawing, the second type attribute indicating a character; and
   determining an attribute of the second region to be identical with the attribute of the first region by using the attribute of the first region when the attribute of the first region is determined to be the first type attribute, whereas the determining determines the attribute of the second region without using the attribute of the first region when the attribute of the first region is determined to be the second type attribute.

2. The image processing device according to claim 1, wherein the determining includes:
   provisionally determining the attribute of the second region to be one of the plurality of attributes irrespective of the attribute of the first region; and
   determining the attribute of the second region by modifying the provisionally determined attribute of the second region and by using the attribute of the first region when the attribute of the first region is determined to be the first type attribute.

3. The image processing device according to claim 1, wherein the computer-readable instructions, when executed by the processor, cause the image processing device to perform consolidating the second region with the first region when the attribute of the first region is determined to be the first type attribute.

4. The image processing device according to claim 3, wherein the computer-readable instructions, when executed by the processor, cause the image processing device to perform consolidating the second region with the first region regardless of the attribute of the second region when the attribute of the first region is determined to be the photo.

5. The image processing device according to claim 1, wherein the computer-readable instructions, when executed by the processor, cause the image processing device to perform:
   identifying a third region disposed inside of the second region; and
   determining an attribute of the third region by using the attribute of the first region when the attribute of the first region is determined to be the first type attribute.

6. The image processing device according to claim 1, wherein the computer-readable instructions, when executed by the processor, cause the image processing device to perform:
   generating a surrounding region that surrounds the image, the surrounding region disposed outside of a region of the image; and
   identifying the surrounding region including the first region.

7. The image processing device according to claim 6, wherein the computer-readable instructions, when executed by the processor, cause the image processing device to perform:
   setting a plurality of blocks in the image, the plurality of blocks being arranged in columns and rows, each of the columns extending in a first direction, each of the rows extending in a second direction orthogonal to the first direction;
   assigning each of the plurality of blocks with an identifier;
   setting a plurality of regions by grouping together a plurality of contiguous blocks having a same identifier from among the plurality of blocks, as one of the plurality of regions;
   selecting sequentially a row from the rows from upstream side to downstream side in the first direction;

selecting sequentially each of the plurality of blocks in the selected row from upstream side to downstream side in the second direction, whereby an (N+1)-th block in the selected row is selected immediately after an N-th block in the selected row is selected, where N is a natural number, and the N-th block is adjacent to the (N+1)-th block;

specifying, while the each of the plurality of blocks in the selected row is selected, a relationship between the first region including the N-th block of the plurality of blocks and the second region including the (N+1)-th block of the plurality of blocks such that the second region is disposed inside of the first region when the identifier of the N-th block is different from the identifier of the (N+1)-th block; and fixing, once the relationship between the first region and the second region is specified, the relationship between the first region and the second region.

8. The image processing device according to claim 1, wherein the computer-readable instructions, when executed by the processor, cause the image processing device to perform:

setting a plurality of blocks in the image, the plurality of blocks being arranged in columns and rows, each of the columns extending in a first direction, each of the rows extending in a second direction orthogonal to the first direction;

assigning each of the plurality of blocks with an identifier;

setting a plurality of regions by grouping together a plurality of contiguous blocks having a same identifier from among the plurality of blocks, as one of the plurality of regions;

selecting sequentially a row from the rows from upstream side to downstream side in the first direction;

selecting sequentially each of the plurality of blocks in the selected row from upstream side to downstream side in the second direction, whereby an (N+1)-th block in the selected row is selected immediately after an N-th block in the selected row is selected, where N is a natural number, and the N-th block is adjacent to the (N+1)-th block; and specifying, while the each of the plurality of blocks in the selected row is selected, a relationship between the first region including the N-th block of the plurality of blocks and the second region including the (N+1)-th block of the plurality of blocks such that the second region is disposed inside of the first region when the identifier of the N-th block is different from the identifier of the (N+1)-th block and the relationship between the first region and the second region has not been specified.

9. The image processing device according to claim 8, wherein the computer-readable instructions, when executed by the processor, cause the image processing device to perform identifying the second region disposed inside of the first region when the relationship between the first region and the second region is specified such that the second region is disposed inside of the first region.

10. The image processing device according to claim 1, wherein the computer-readable instructions, when executed by the processor, cause the image processing device to perform determining the attribute of the first region based on an image represented in the first region.

11. A non-transitory computer-readable storage medium storing computer-readable instructions that, when executed by a processor cause an image processing device to perform:

preparing image data representing an image;

identifying a first region in the image and a second region disposed inside of the first region;

determining an attribute of the first region to be one of a plurality of attributes, the plurality of attributes including a first type attribute and a second type attribute, the first type attribute indicating one of photo and drawing, the second type attribute indicating a character; and determining an attribute of the second region to be identical with the attribute of the first region by using the attribute of the first region when the attribute of the first region is determined to be the first type attribute, whereas the determining determines the attribute of the second region without using the attribute of the first region when the attribute of the first region is determined to be the second type attribute.

12. A method for controlling an image processing device, the method comprising:

preparing image data representing an image;

identifying a first region in the image and a second region disposed inside of the first region;

determining an attribute of the first region to be one of a plurality of attributes, the plurality of attributes including a first type attribute and a second type attribute, the first type attribute indicating one of photo and drawing, the second type attribute indicating a character; and determining an attribute of the second region to be identical with the attribute of the first region by using the attribute of the first region when the attribute of the first region is determined to be the first type attribute, whereas the determining determines the attribute of the second region without using the attribute of the first region when the attribute of the first region is determined to be the second type attribute.

* * * * *